United States Patent Office 3,287,330
Patented Nov. 22, 1966

3,287,330
POLYETHER POLYMERS HAVING UNSATURATED SIDE CHAINS
James G. Burt, Oxford, Pa., and Henry C. Walter, Brandywine Hundred, Del., assignors to E. I. du Pont de Nemours and Company, Wilmington, Del., a corporation of Delaware
No Drawing. Filed Feb. 6, 1958, Ser. No. 713,538
16 Claims. (Cl. 260—79.5)

This application is a continuation-in-part of our copending application Serial No. 644,716 filed March 8, 1957, and now abandoned.

This invention relates to novel polyether polymers and more particularly to millable polyalkyleneether polymers having side chains which contain non-aromatic carbon-to carbon unsaturation and, therefore, may be conveniently cured to form highly useful elastomers.

Heretofore various polyalkyleneether polymers have been prepared, usually by methods involving the polymerization of cyclic ethers or polyhydroxy compounds, and these polymers range from relatively low molecular weight liquids and oils to relatively high molecular weight liquids and solids. These polymers, however, do not, on curing, form useful elastomers. In addition to these polyalkyleneether polymers, other polymers have been prepared which contain recurring ether linkages, such as polyurethanes which are prepared from polyalkyleneether glycols and organic diisocyanates. These polymers may be conveniently cross-linked by means of polyisocyanate curing agents; however, they do tend to show a certain degree of thermal instability due to the presence of groups such as urethane or allophanate groups. It would, therefore, be highly desirable to provide a polyether polymer which is highly stable and which may be conveniently cured to useful elastomers by means of well-known curing procedures.

It is an object of the present invention to provide novel polyether polymers. A further object is to provide novel millable polyalkyleneether polymers having side chains containing non-aromatic carbon-to-carbon unsaturation which polymers may be cured to highly useful elastomers by curing procedures involving the use of sulfur. A still further object is to provide a process for the preparation of these novel polyalkyleneether polymers. Other objects will appear hereinafter.

These and other objects of this invention are accomplished by a millable, sulfur-curable polyalkyleneether polymer having a molecular weight of at least about 30,000 and consisting essentially of the recurring units ⟨G–O⟩ wherein G is a radical selected from the group consisting of an alkylene radical and a substituted alkylene radical, with the proviso that at least about one-third of the G's be tetramethylene radicals and that there be at least one G for every 10,000 units of molecular weight of polymer, having a side chain which contains a non-aromatic carbon-to-carbon unsaturated group.

These polymers may be conveniently prepared by effecting a polymerization of a selected mixture of cyclic ethers in the presence of a selected cationic catalyst, such as the well-known Friedel-Craft catalysts. The method of preparation will be more fully described hereinafter.

More particularly, in the above recited ⟨G–O⟩ units, G represents the tetramethylene radical of tetrahydrofuran and also the alkylene residues of oxiranes and oxetanes. The latter 3- and 4-membered ring systems may contain substituents such as hydrocarbon substituents, but not more than one such substitutent should be attached to the carbon atoms which are attached to the cyclic ether oxygen. The substituents may be aliphatic, cycloaliphatic, aromatic, or mixed types, or may constitute part of a cyclic structure. These substituents, in turn, may bear groups which are non-reactive toward the cationic polymerization catalysts. Thus the groups may be halogen, preferably chlorine, alkoxy or aryloxy. In general, groups containing Zerewitinoff active hydrogen cannot be present since active hydrogen reacts with and may destroy the activity of the cationic catalyst which is employed to effect polymerization of the cyclic ethers. At least one of the 3- or 4-membered cyclic ethers employed must have at least one substituent which contains a non-aromatic carbon-to-carbon unsaturated group in order that the resulting polyalkyleneether polymer have these unsaturated groups present in a side chain. These unsaturated groups serve as potential curing sites.

Accordingly, the polyalkyleneether polymers of the present invention may be represented as consisting essentially of structural units (a) 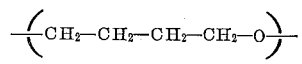

(b) 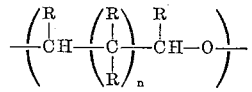

wherein the number of (a) units is at least one-third of the total number of structural units, the structural units being connected from a carbon atom on one to an oxygen atom on the other, $n$ is an integer ranging from zero to one; R is a radical having a molecular weight of not greater than about 250 and selected from the group consisting of hydrogen or any inert radical, i.e., a radical which is non-reactive with the polymerization catalyst employed in the preparation of these polymers; with the proviso that there be at least one R which contains non-aromatic carbon-to-carbon unsaturation for every 10,000 units of molecular weight of polymer. The inert radicals which are represented by R may be further defined as being hydrocarbon radicals, halogenated hydrocarbon radicals, or the corresponding oxa-analogs of these hydrocarbon and halogenated hydrocarbon radicals. Thus, these radicals may be acyclic, cyclic, and mixed acyclic/cyclic radicals, such as aliphatic, cycloaliphatic, aromatic, and mixed aliphatic/aromatic radicals, which may contain, in addition to carbon and hydrogen, organically bonded halogen and oxygen atoms. R may be a divalent oxa-analog of said hydrocarbon and halogenated hydrocarbon radicals, which analog has a residual valence on a terminal oxygen atom which valence is attached to a carbon atom in another recurring unit derived from the oxirane, oxetane or tetrahydrofuran. In this instance a partially cross-linked millable polymer is obtained. In order that these radicals be inert, i.e., non-reactive with the polymerization catalysts, they should not contain any Zerewitinoff active hydrogen atoms and when they do contain an oxygen atom, this oxygen atom should be present as an acyclic ether oxygen, which is at least two carbon atoms removed from any other ether oxygen and from any halogen atom in the polymer. These radicals should have a molecular weight of not greater than about 250. While these radicals represented by R are classified as inert in regard to their activity with the polymerization catalyst, they may, nevertheless, be considered as functional or non-functional in regard to their serving as potential cross-linking sites. Thus the radicals represented by R which would be functional would be those which contain non-aromatic carbon-to-carbon unsaturation. It is to be understood that R need not necessarily be, and it is preferred that it not be, the same in every instance in any given polymer.

As mentioned above, the radicals represented by R may be aliphatic, cycloaliphatic, or aromatic radicals. The aliphatic and cycloaliphatic hydrocarbon portion of these radicals may be saturated or unsaturated acyclic or cyclic structures as exemplified by alkyl, cycloalkyl, mixed alkylcycloalkyl, and the corresponding radicals having non-aromatic carbon-to-carbon unsaturation. These non-aromatic substituent portions may be divalent, such as alkylene radicals, which, for example, together with the carbon atoms or atom in the linear polymer chain, may constitute a cyclic structure such as the 1,2-cyclohexylene radical (formed by attaching tetramethylene to adjacent carbon atoms in the linear polymer chain) or which may link other radicals, such as alkenyl, cycloalkyl, cycloalkenyl, aryl, alkenyloxy, alkyloxy, cycloalkyloxy, cycloalkenyloxy, aryloxy, chloro radicals, and the like, to the carbon atoms in the polmer chain.

Examples of the aromatic portion of these substituent cyclic and acyclic-cyclic radicals are phenyl, phenylene, and substituted phenyl and phenylene radicals, and the corresponding radicals of the naphthalene series, and the like. These aromatic radicals may be attached directly to the carbon atoms in the linear polymer chain or indirectly through carbon or oxygen to an appendage of the aliphatic type described above. Thus the aromatic radical may be phenyl, or chloro-, alkyl-, alkoxyl-, alkenyl-, or alkenyl-oxy-substituted phenyl, and the like. Or the aromatic radical may be benzyl, homologs of benzyl, or benzyl and its homologs which are substituted as described above for the phenyl series. The aliphatic-aromatic mixed radical may be divalent such as o-phenylenemethyl, as found, for example, in the 1,2-indenylene radical.

The above described side chain groups, as represented by R, which contain non-aromatic carbon-to-carbon unsaturation may be classified as functional groups in the sense that they serve as potential curing sites. The side chain groups which do not contain such unsaturation may be classified as non-functional substituents; however, they do provide other desirable characteristics to the polymer, both before and after it is cured by a curing procedure involving the use of sulfur. For example, highly useful elastomers having varying degrees of freeze-resistance in the cured state can be obtained by controlling the relative number of and the nature of these non-functional side chains. Thus the substituted alkylene radicals represented by —G— in the general formula ${G—O}$ may be non-functional homologs and isomers of each other, such as: 1,2-propylene, 1,2-butylene, 1,3-butylene, 2,3 - butylene, 2 - methyl-1,3 - propylene, cyclohexylidene-dimethylene, 1,2-octylene, and like radicals; related radicals such as cycloalkylene, e.g., 1,2-cyclohexylene; chloro-substituted derivatives of the above, such as the 3-chloro-1,2-propylene and the 2,2-bis(chloromethyl)-1,3-propylene radicals. They may be members of the aralkylene series such as 2-phenyl-1,2-ethylene, 3-(o-chlorophenyl)-1,2-propylene, 2-(p-tolyl)-1,3-propylene, and like radicals. They may be oxa-analogs of any of the above, such as 3-methoxy-1,2-propylene, 4-(3-methoxyphenyl)-1,2-butylene, 3-phenoxy-1,2-propylene, 2-methyl-2-methoxymethyl-1,3-propylene, and like radicals.

A limitation on the polymers of the present invention is that they have a side chain, R, on an average of at least once for every 10,000 units of molecular weight of polymer which contains non-aromatic carbon-to-carbon unsaturation. These side chains are necessary in order for the polymers to be curable to highly useful elastomers by curing procedures which involve the use of sulfur. These side chains which contain non-aromatic carbon-to-carbon unsaturation may be classified as functional side chains in the sense that they are the potential cross-linking sites for sulfur curing or vulcanization. Representative radicals, —G—, which contain non-aromatic carbon-to-carbon unsaturation are 2-vinyl-1,2-ethylene, 1-allyl- and 1-crotyl-1,2-ethylene, 1 - allyl - 1,2 - propylene, 2-ethyl-2-allyl-1,3-propylene, 2 - ethyl-2-allyloxymethyl-1,3-propylene, 2-ethyl-2(4-allylphenyloxymethyl)-1,3-propylene, 1-allyloxymethyl - 1,2-ethylene, 2-(4-allylphenyl)-1,2-ethylene, 3-(2-allylphenyloxy)-1,2-propylene, and 3-(2,4-diallylphenyloxy)-1,2-propylene.

As mentioned above, the novel polyether polymers of the present invention are prepared by polymerization of a mixture of cyclic ethers in the presence of cationic catalysts. These cyclic ether molecules will be monomeric, i.e., will contain only one cyclic ether link in the molecule, and some of them will be substituted with various substituents including a group or groups which contain non-aromatic carbon-to-carbon unsaturation so that the resulting polyether polymer will contain these substituent groups as more particularly identified by R in the above recited formula. The cyclic ether rings will be 3-, 4-, or 5-membered rings in which the carbon atoms of the ring are saturated and the lone hetero atom is oxygen. The 3- and 4-membered cyclic ethers may contain one or more substituents, preferably not more than two. In the present embodiment of this invention, at least about ⅓ of the total number of cyclic ethers in the mixture to be polymerized will be represented by tetrahydrofuran. Also at least some fraction of the total number of the 3- and 4-membered cyclic ethers will bear a substituent containing non-aromatic, preferably olefinic, carbon-to-carbon unsaturation, and this fraction will be equal to at least one such substituent for every 10,000 units of molecular weight in the resulting polyether polymer.

The 3-membered rings are represented by the ethylene oxide (epoxide, oxirane) series, the 4-membered rings by the 1,3-propylene oxide (oxacyclobutane, oxetane) series, and the 5-membered ring by tetrahydrofuran. The 3- and 4-membered saturated ether rings may contain one or more substituents, preferably at least one and not more than two, which are linked to the ring through carbon and which may contain non-aromatic carbon-to-carbon unsaturation. Also, in these 3- and 4-membered ethers, the two carbon atoms which are bonded to the ether oxygen will each contain at least one hydrogen, and, in the oxetanes, both of these carbon atoms will preferably, but not necessarily, be in the form of methylene groups.

The epoxides and oxetanes which may be used in preparing the polymers of the present invention may be represented as follows:

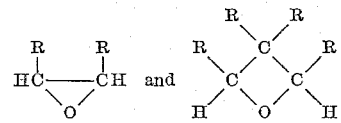

wherein R is any radical which is inert to the polymerization catalyst employed, such as hydrogen, a hydrocarbon radical, a halogenated hydrocarbon radical, or the corresponding oxa-analogs of these hydrocarbons and halogenated hydrocarbon radicals, including radicals containing non-aromatic carbon-to-carbon unsaturation.

The epoxides which may be used according to the method of this invention are obtained either by monoepoxidation of monoolefinic and diolefinic hydrocarbons and ethers, or by condensation of certain functionally substituted epoxides with appropriately substituted reagents. Thus there may be employed the monoepoxidation products of (1) olefinic and diolefinic hydrocarbons such as of ethylene, propylene, the appropriate butylenes and amylenes, 1-hexene, 1-dodecene, butadiene, styrene, β-methylstyrene, allylbenzene, 4-vinylcyclohexene, and the like, and of (2) the oxa-analogs of the olefinic and diolefinic hydrocarbons. These unsaturated ethers containing one or two ethylenic double bonds are available via the Williamson ether synthesis, involving reaction of a hydroxylic compound (as its metal salt) with an appropriate organic halide. Either one or both of the reactants may be unsaturated. For example, a metal salt of an unsaturated alcohol such as allyl alcohol, crotyl alcohol, 3-hexenol, 4-octenol, 3-methyl-5-decenol, 2-tetradecenol, n-octadeconol, and the like, is condensed with an organic halide such as n-propylbromide, allylbromide, crotylchloride, 2-phenylethyliodide, and the like, to produce the corresponding ethers having one or more olefinic groups as desired. Alternatively, any of the above represented unsaturated alcohols may first be converted into the bromide and reacted in the ether synthesis with a variety of saturated and unsaturated aliphatic alcohols and phenols such as the simple alkanols, 4-chlorobutyl alcohol, hydroxymethylcyclopentane, 1-hydroxymethylcyclohexene, hydroxymethylcyclobutane, any of the unsaturated aliphatic alcohols mentioned above, cinnamyl alcohol, phenol, m-cresol, 4-chlorophenol, 4-allylphenol, 3,4-dimethylphenol, 3-phenylpropyl alcohol, p-nonylphenol, 2,4-diallylphenol, and the like. Similarly, epichlorhydrin, in being readily available and reactive towards salts of aliphatic and aromatic hydroxy compounds in the Williamson ether synthesis, is a particularly valuable starting material for the preparation of epoxy ethers. Thus, from the representative alcohols and phenols described above, a wide variety of substituted epoxides is obtained for use in the process of this invention.

Suitable oxetanes or oxycyclobutanes may be prepared by ring-closing derivatives of 1,3-gylcols, such as 1,3-halohydrins and 1,3-acetoxy halides. For example, the action of alcoholic alkali on pentaerythritol dichlorhydrin can be made to yield 3-hydroxymethyl-3-chloromethyloxetane and/or 3-alkoxymethyl-3-hydroxymethane oxetane, as desired. The hydroxymethyl groups are etherified on reaction with organic halides as described above for the preparation of suitable saturated and unsaturated ethers. Oxetanes containing hydroxyalkyl groups may also be prepared from polyhydroxy compounds which have, in addition to a 1,3-gylcol unit, one other hydroxy group on an adjacent carbon atom. This polyhydroxy compound is first converted into a cyclic carbonate with phosgene, is then heated, usually in the presence of a trace of alkali or carbonate, to split out carbon dioxide and thus form the 4-membered cyclic ether. This method is particularly valuable for preparing 3-substituted-3-hydroxymethyl oxetanes, e.g., 3-ethyl-3-hydroxymethyl oxetane, and may also be used to prepare hydroxyalkyl epoxides. A wide variety of suitable trihydroxy compounds for use in the above reaction sequence is obtained by reacting excess formaldehyde and caustic with an aldehyde having two alpha hydrogen atoms. Also, 1,3-gylcols may be prepared from malonic esters and substituted malonic esters by reduction, e.g., with lithium aluminum hydride. Treating the 1,3-diols with hydrogen bromide in acetic acid yields the bromo acetoxy compounds which, in turn, are ring-closed with caustic in the usual way. Thus representative diols such as 2,2-diethyl-1,3-propanediol and 2-methyl-2-allyl-1,3-propanediol, may be converted by the above sequence into 3,3-diethyloxetane and 3-ethyl-3-allyloxetane, respectively.

Representative oxetanes containing radicals which are inert to the polymerization catalyst of the functional and non-functional type are trimethylene oxide and its 2-methyl-, 2,4-dimethyl-, 3-butyl-, 3-phenyl-, 3-(allylphenyl)-, 3,3-dimethyl-, 3,3-bis(chloromethyl)-, 3,3-diethyl-, 3-ethyl-3-allyloxymethyl-, 3-vinyl-, 3-allyl-, 3-methyl-3-crotyl, 3,3-bis(ethoxymethyl)-, and 3-chloromethyl-3-allyloxymethyl-derivatives. Other representative oxetanes are compounds such as 2-oxaspiro[3,5]nonane, 2-oxaspiro[3,4]octane, and the like.

The preferred epoxides and oxetanes which are useful may be represented as follows:

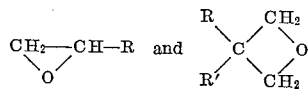

where R represents a radical such as methyl, ethyl, and the like, chloromethyl, cyclopentyl, cyclohexyl, vinyl, allyl, methallyl, 4-hexenyl, 7-octenyl, cyclohexenyl, propyloxymethyl, ethyloxymethyl, allyloxymethyl, phenyloxymethyl, 4-pentenyloxymethyl, 2,4-diallylphenyloxymethyl, 4-allyloxyphenyl, 2-allyloxybenzyl, and 4-allylbenzyl; and where R' is H, a lower alkyl radical, or a lower alkoxymethyl radical.

In preparing the polyether polymers of the present invention, polymerization of the selected mixture of cyclic ethers is effected in the presence of a cationic catalyst at temperatures ranging from well below to somewhat above ordinary temperatures. The polymerization may be carried out from about −80 to 70° C. Normally the temperature will be in the range of −20 to 30° C. When aryldiazonium hexafluorophosphates are employed as catalysts, the polymerization temperature may range from about 0 to 70° C., with 20 to 40° C. being preferred. The quantity of catalyst will vary from about 0.005 to 0.5 mol percent based on the cyclic ether monomers employed. The catalyst may be added to the mixture of cyclic ethers, or vice versa, or the cyclic ethers, individually and randomly, may be mixed in the presence of the catalyst. Polymerization is exothermic and generally proceeds without the further application of heat. The mixture is allowed to stand, or is stirred, until the desired degree of polymerization is attained, i.e., until the polyether polymer has an inherent viscosity of at least 1.0. An inherent viscosity of at least 1.0, when determined on a 0.1% solution of the polyether polymer in benzene at 30° C. represents an average molecular weight of at least 30,000. To recover the polymer, the catalyst is first deactivated or destroyed, in general, by introducing reactive substances such as water, alcohols, amines, and the like. Preferably employed are water or ammoniated water in combination with an organic solvent for the polymer, such as tetrahydrofuran, dioxane, dimethylformamide, ethyl ether and the like. If the solvent for the polymer is omitted, the deactivating agent for the catalyst is simply added, preferably in excess for complete reaction, and the mixture agitated for rapid results. When a solvent is employed in the catalyst-deactivating step, the work-up depends upon whether the solvent is miscible or not with water. If immiscible, the solvent layer is separated from the aqueous layer, may be rewashed to completely remove soluble impurities, and finally stripped in vacuum from the polymer. If the solvent is miscible with water, excess water is added to precipitate the polyether polymer, which is then recovered. If desired, the polymer may be washed on rubber wash mill to insure complete removal of occluded water-soluble impurities. Drying of the polymer may be done in the usual way, e.g., by pumping in vacuum, storing over desiccants or by milling on a rubber mill to drive off water as vapor.

In order to obtain polyether polymers of molecular weights of at least about 30,000, it is necessary that the monomeric cyclic ethers be free of any side chain substituents which would interfere with the polymerization. Thus these cyclic ethers should not contain any groups which have Zerewitinoff hydrogen atoms, such as amino group, hydroxyl groups, carboxyl groups, etc., and if any of these side chain substituents contain an oxygen or halogen atom, these atoms must be at least two carbon atoms removed from any other oxygen atom. It is also desirable that the polymerization be effected and maintained under anhydrous conditions and it is also desirable to exclude air while the reaction is being carried on in order to avoid auto-oxidation of the cyclic ethers. This may conveniently be done by carrying out the polymerization in a reactor using a dry, inert gas, such as nitrogen.

When preparing these polyether polymers, the extent of polymerization as reflected by the inherent viscosity of the polymer depends upon the temperature at which polymerization is effected and the particular catalyst used and its concentration. In general, the lower the concentration of the catalyst, the higher the molecular weight of the resulting polyether polymer. Also, when the reaction temperature is higher, the molecular weight of the resulting polyether polymer will be lower. It is preferred to carry out the polymerization at a temperature of from about −20 to 30° C. except when aryldiazonium hexafluorophosphates are used as catalysts; then the preferred range is about 20 to 40° C. It is to be understood that the particular temperature required for optimum results with any particular mixture of cyclic ether will depend upon the reactivity of the ethers used.

The cationic catalysts which are used to effect polymerization of the cyclic ethers are inorganic acidic materials sometimes broadly referred to as Friedel-Craft catalysts, such as the boron halides, aluminum halides, antimonic halides, stannic halides, and certain phosphoric halides, particularly the chlorides and/or fluorides of these elements. In order to obtain the high molecular weight polymers of the present invention, the catalyst must be chosen with regard for the particular mixture of cyclic ethers employed. In other words, with any combination of cyclic monomers there will be an optimum catalyst and its concentration, in addition to an optimum temperature as stated above. In the present invention it has been found that a few catalysts are generally applicable to the preparation of the desired polymers from mixtures of the cyclic ethers defined above. These are phosphorous pentafluoride, antimony pentachloride, antimony pentafluoride and their mixtures, and, to a lesser extent, boron trifluoride.

The aryldiazonium hexafluorophosphates which may be used as catalysts are prepared by reacting the appropriate aryldiazonium chloride with ammonium hexafluorophosphate according to the process disclosed by Lange and Müller in Berichte 63, pages 1058 to 1070 (1930). The aryldiazonium hexafluorophosphates useful include those where the aryl group is phenyl, naphthyl, etc.; and the aromatic ring may be substituted with groups which are inert to the polymerization reaction, as for example, alkyl, alkoxy, halogen, and the like. A preferred aryldiazonium hexafluorophosphate is p-chloro-benzenediazonium hexafluorophosphate. Other operable species include benzenediazonium hexafluorophosphate, o-tolyl-diazonium-hexafluorophosphate, and diphenylene-4,4'-bisdiazonium hexafluorophosphate.

Gaseous phosphorous pentafluoride may be dissolved directly in the monomers to be polymerized, whereby polymerization starts spontaneously soon after mixing is effected and thereafter it may be necessary to remove heat of polymerization. Alternatively, the phosphorous pentafluoride may be first brought in contact with a molar equivalent or more of a cyclic ether such as tetrahydrofuran and the resulting complex then used to polymerize a mixture of cyclic ethers. Similarly the antimony halides and boron fluoride may be used as such or as their molecular complexes with a cyclic ether.

The catalyst concentration should be in the range of 0.005 to 0.5 mol percent, based on the total mols of cyclic ethers to be polymerized. Below about 0.01 to 0.02 mol percent, or 0.005 mol percent in the case of the aryldiazonium hexafluorophosphates, yields tend to be erratic. The inherent viscosities of the polymers prepared at relatively high catalyst concentrations tend to lower values than desired. The preferred range of concentrations will vary with monomer composition, the reaction temperature chosen, and the nature of the catalyst. It will normally be in the range of 0.02 to 0.2 mol percent except when aryldiazonium hexafluorophosphates are used; then a concentration of about 0.01 mol percent is preferred.

In order that the polyether polymers of this invention possess the desired elastomeric properties, they should be comprised of at least about 33⅓ mol percent of the tetramethylene radicals obtained from tetrahydrofuran. In the preferred products of this invention, these tetramethylene radicals comprise from about 50 to 90% of the total number of alkylene radicals in the linear polymer chain.

Since the polyether polymers of this invention have side chains containing non-aromatic, carbon-to-carbon unsaturation, and these side chains serve as potential cross-linking sites, the molecular weights and the mol fractions of the particular cyclic ether monomers employed should be such as to provide on the average one side chain containing non-aromatic, carbon-to-carbon unsaturation for every 10,000 units of molecular weight of polymer so that the product can be effectively cured. It is understood that there may be more cross-linking sites present and that the number of cross-linking sites present in the polymer may be in excess of the number utilized in the curing step. On the average, it is preferred not to have more than about one cross-linking site per 500 units of molecular weight of polymer.

Since groups containing non-aromatic, carbon-to-carbon unsaturation are also inherently polymerizable by cationic catalysts, it is remarkable that the polymers of the present invention are of relatively high molecular weight, having the unsaturated groups available for subsequent curing procedures. The soluble polymers of this invention have inherent viscosities of at least 1.0, when determined on 0.1% solutions in benzene at 30° C. These inherent viscosities correspond to molecular weights of at least about 30,000. Polymers having lower inherent viscosities tend to be too soft and sticky, and thus are difficult to mill and process in conventional equipment. All the polyether polymers of this invention are millable and processable in conventional equipment of the rubber industry, and they can be mixed with the usual compounding ingredients in the usual way. The subject polymers can be obtained as essentially linear molecules. Sometimes, however, they may be branched or cross-linked, depending on the catalyst used or types of side chains. It is necessary that the polymer not be too highly branched or cross-linked in order that it be millable and curable to form valuable elastomers. It is believed that the branching or cross-linking and subsequent gelation occurs when a polymer has a benzyl ether or allyl ether type group in its side chain. It may then be attached by the active end of another polymer chain which displaces the benzyl or allyl type radical from the ether oxygen and attaches itself as a branch. The chances for chain branching of this type to occur at a particular temperature increase when more recurring polymer units are present which contain these allyl ether and benzyl ether type side groups, and when the catalyst is not destroyed soon after the linear polymers have been prepared. The present invention contemplates within its scope the preparation of these partially gelled branched or cross-linked polymers which are millable and capable of being cured to form highly useful elastomers.

The polyether polymers of the present invention may be conveniently cured by procedures involving the use of sulfur. These sulfur-curing procedures are more particularly illustrated in the following examples. In general, about 0.1 to 2.0 parts of sulfur per 100 parts of polymer is needed to effect the cure in the presence of appropriate accelerators. The uncured polyether may be compounded with the curing agents and it is then stable and may be stored until it is desired to complete the cure, i.e., by heating, usually at 125 to 160° C. for from 0.5 to several hours. It is to be understood that various modifications of the sulfur cure may be employed, depending on the type of polyether used. Various procedures and modifications of sulfur-curing are more particularly described in "Encyclopedia of Chemical Technology," Kirk and Orthmer, published by Interscience Encyclopedia, Inc., New York, 1953, vol. II, pp. 892–927; "Principles of High Polymer Theory and Practice," Schmidt & Marlies, published by McGraw-Hill Book Co., Inc., New York 1948, pp. 556 and 566; "Chemistry and Technology of Rubber," Davis & Blake, published by Reinhold Publishing Corp., New York, 1937, vol 74, chapter VI; and U.S.P. 2,808,391.

The following examples illustrate the present invention; however, the invention is not intended to be limited to these examples. Parts are by weight unless otherwise indicated.

The stress-strain properties of the cured elastomers are determined by the conventional methods used in the rubber industry.

*Example 1*

A. 360 parts of tetrahydrofuran, freshly distilled under nitrogen from lithium aluminum hydride, was put into a flask which had been dried by heating over a flame and then cooled in nitrogen, followed by the addition of 28.5 parts of 1-allyloxy-2,3-epoxypropane, freshly distilled under reduced pressure. The flask was cooled in ice and to the solution was added 0.75 part of antimony pentachloride. All additions were made under a sweep of dry nitrogen. The flask was closed and kept at 0° C. for 48 hours. A soft, rubbery solid polymer was obtained which was dissolved in 2900 parts of tetrahydrofuran containing 30 parts of concentrated ammonium hydroxide solution and 40 parts of water. The polymer was precipitated by adding the solution slowly to a large excess of ice water in a Waring Blendor and was redissolved in 3340 parts of tetrahydrofuran containing 2.5 parts of phenyl-β-naphthylamine. The polymer was reprecipitated by pouring into a large volume of water and was dried on a rubber mill at 100° C. There was obtained 302 parts of a soft, rubbery polymer having an inherent viscosity of 1.40 in benzene at 30° C. and an iodine number of 19.1. This polymer was readily milled on a cold rubber mill.

B. 30 parts of the polymer prepared above was compounded on a rubber mill with 9 parts of high abrasion furnace black, 1.5 parts of zinc oxide, 0.9 part of sulfur, and 0.23 part of tetraethyl thiuram disulfide, and the compound was vulcanized in molds under pressure for 2 hours at 150° C. The resulting elastomer was resilient and rubbery with a tensile strength of 3100 lbs./sq. in. and an elongation of 340%. It had a Yerzley resilience of 70%, Shore hardness of 67, and a compression set (method B, 22 hours, 70° C.) of 21%.

*Example 2*

A. As in Example 1, 72 parts of tetrahydrofuran, 11.4 parts of 1-allyloxy-2,3-epoxypropane, and 0.08 part of antimony pentachloride were kept in an ice bath in a flask under nitrogen for 48 hours. The polymerized mass was dissolved in 450 parts of tetrahydrofuran containing 5 parts of concentrated aqueous ammonium hydroxide and 5 parts of water. The polymer was precipitated by adding the solution to a large volume of ice water in a Waring Blendor. It was redissolved in 450 parts of tetrahydrofuran containing 0.5 part of phenyl-β-naphthylamine and reprecipitated as before. After drying on a rubber mill at 100° C., there was obtained 35.5 parts of a soft, rubbery polymer having an inherent viscosity of 1.16 in benzene at 30° C. This polymer was readily milled on a cold rubber mill.

B. 8 parts of the polymer prepared in A above was compounded on a rubber mill with 0.16 part of sulfur, 0.32 part of mercaptobenzothiazole disulfide, 0.08 part of mercaptobenzothiazole and 0.04 part of zinc dibutyl dithiocarbamate. The compounded polymer was vulcanized by heating in a mold under pressure at 140° C. for 2 hours and formed a snappy, resilient elastomer.

*Example 3*

A. Following the procedure of Example 1, the following quantities of reactants were mixed and kept at 0° C. under nitrogen for 24 hours:

|  | 1 | 2 | 3 | 4 |
|---|---|---|---|---|
| Tetrahydrofuran | 72 | 72 | 72 | 72 |
| 1-allyloxy-2,3-epoxypropane | 4.56 | 3.42 | 2.28 | 1.14 |
| Antimony pentachloride | 0.15 | 0.15 | 0.15 | 0.15 |

The polymers were dissolved in tetrahydrofuran (1 in 450 parts, 2 in 675 parts, 3 and 4 in 890 parts each) containing 5 parts of concentrated aqueous ammonium hydroxide, 5 parts of water, and 0.5 part of phenyl-β-naphthylamine. They were precipitated by adding the solutions to large volumes of water. After washing on a rubber wash mill and drying on a rubber mill at 100° C., the following rubbery polymers were obtained:

|  | 1 | 2 | 3 | 4 |
|---|---|---|---|---|
| Polymer weight, parts | 47.5 | 53.0 | 50.3 | 49.5 |
| Inherent viscosity in benzene at 30° C. | 1.13 | 1.31 | 1.48 | 2.23 |

These polymers were readily milled on a cold rubber mill.

B. 10 parts of each of the polymers prepared in A above were compounded on a rubber mill with 3 parts of high abrasion furnace black, 0.20 part of sulfur, 0.40 part of mercaptobenzothiazole disulfide, 0.10 part of mercaptobenzothiazole, and 0.05 part of zinc dibutyl dithiocarbamate and the compounds were cured by heating under pressure in molds at 150° C. for 2 hours. The rubbery vulcanizates had the following properties:

|  | 1 | 2 | 3 | 4 |
|---|---|---|---|---|
| Tensile strength (lbs./sq. in.) | 2,870 | 2,210 | 2,900 | 3,050 |
| Elongation (percent) | 440 | 550 | 550 | 710 |
| Modulus at 300% extension (lbs./sq. in.) | 1,470 | 1,440 | 1,020 | 670 |

*Example 4*

A. In a flask which had been heated to dryness over a flame and cooled in nitrogen was put 216 parts of tetrahydrofuran, freshly distilled under nitrogen from lithium aluminum hydride, 17.1 parts of 1-allyloxy-2,3-epoxypropane, and 22.5 parts of 1-phenoxy-2,3-epoxypropane, both freshly distilled under reduced pressure. The flask was cooled in ice and to the solution was added 0.45 part of antimony pentachloride. All additions were made under a sweep of nitrogen. The flask was closed and kept in an ice bath for 48 hours. The polymerized mass was dissolved in 1340 parts of tetrahydrofuran containing 20 parts of concentrated ammonium hydroxide solution and 20 parts of water. The polymer was precipitated by adding it slowly to a large excess of ice water in a Waring Blendor and was redissolved in 1340 parts of tetrahydrofuran containing 1.5 parts of phenyl-β-naphthylamine. The polymer was reprecipitated with ice water in a Waring Blendor and was dried on a rubber mill at 100° C. There was obtained 199.5 parts of a soft, rubbery polymer with an inherent viscosity of 1.72 in benzene at 30° C. This polymer was readily milled on a cold rubber mill.

B. 22 parts of the polymer prepared in A above was compounded on a rubber mill with 6.6 parts of high abrasion furnace black, 0.44 part of sulfur, 0.88 part of mercaptobenzothiazole disulfide, 0.22 part of mercaptobenzothiazole, and 0.088 part of zinc dibutyl dithiocarbamate and the compound was vulcanized in molds under pressure for 2 hours at 140° C. The resulting elastomer had a tensile strength of 2250 lbs./sq. in.; an elongation of 500%; Shore hardness of 65; Yerzley resilience of 56%; and compression set (method B, 22 hours at 70° C.) of 57%.

Example 5

A. In a flask which had been heated over a flame and cooled in nitrogen was put 72 parts of tetrahydrofuran, freshly distilled under nitrogen from lithium aluminum hydride, 39 parts of 3,3-bis(chloromethyl)oxacyclobutane, and 5.7 parts of 1-allyloxy-2,3-epoxypropane, both freshly distilled under reduced pressure. To the solution was added 0.20 part of antimony pentachloride. All additions were made under a sweep of nitrogen. The flask was closed and kept in an ice bath for 24 hours. The solid polymerizate was dissolved in 670 parts of tetrahydrofuran containing 5 parts of concentrated aqueous ammonium hydroxide, 5 parts of water, and 0.75 part of phenyl-$\beta$-naphthylamine. The polymer was precipitated by adding to a large volume of water and was washed on a rubber wash mill. After drying on a rubber mill at 100° C. there was obtained 77.5 parts of a soft, rubbery polymer having an inherent viscosity of 1.13 in benzene at 30° C. This polymer was readily milled on a cold rubber mill.

B. 20 parts of the polymer prepared in A above was compounded on a rubber mill with 6 parts of high abrasion furnace black, 1 part of zinc oxide, 0.6 part of sulfur, and 0.3 part of tetraethyl thiuram disulfide, and the compound was vulcanized in molds under pressure for 2 hours at 150° C. The vulcanizate was resilient and rubbery and had a tensile strength of 2250 lbs./sq. in.; an elongation of 380%; Shore hardness of 65; Yerzley resilience of 69%; and compression set (method B, 22 hours at 70° C.) of 38%.

Example 6

A. In a flask which had been heated over a flame and cooled in nitrogen was put 72 parts of tetrahydrofuran, freshly distilled under nitrogen from lithium aluminum hydride, 31 parts of 3,3-bis(chloromethyl)oxetane, and 7.8 parts of 3-ethyl-3-allyloxymethyloxacyclobutane, both freshly distilled under reduced pressure. To the solution was added 0.2 part of antimony pentachloride. All additions were made under a sweep of nitrogen. The flask was closed and kept in an ice bath for 24 hours. The solid polymerizate was dissolved in 890 parts of tetrahydrofuran containing 5 parts of concentrated aqueous ammonium hydroxide, 5 parts of water, and 0.5 part of phenyl-$\beta$-naphthylamine. The polymer was precipitated by adding to a large volume of water and was washed on a rubber wash mill. After drying on a rubber mill at 100° C. there was obtained 76 parts of a soft, rubbery polymer having an inherent viscosity of 1.40 in benzene at 30° C. This polymer was readily milled on a cold rubber mill.

B. 20 parts of the polymer prepared in A above was compounded on a rubber mill with 6 parts of high abrasion furnace black, 1 part of zinc oxide, 0.6 part of sulfur, and 0.3 part of tetraethyl thiuram disulfide, and the compound was vulcanized in molds under pressure for 2 hours at 150° C. The rubbery vulcanizate had a tensile strength of 1350 lbs./sq. in.; an elongation of 210%; Shore hardness of 62; Yerzley resilience of 62%; and compression set (method B, 22 hours, 70° C.) of 27%.

Example 7

A. In a flask which had been heated over a flame and cooled in nitrogen was put 178 parts of tetrahydrofuran, freshly distilled under nitrogen from lithium aluminum hydride. The flask was cooled in ice and 0.44 part of phosphorous pentafluoride mixed with nitrogen was passed into the solution while it was being agitated. Immediately afterwards, a mixture of 56.2 parts of 3,3-diethyloxetane and 19.7 parts of 3-ethyl-3-allyloxymethyloxetane, both freshly distilled under reduced pressure from calcium hydride, was added rapidly to the solution in the flask. Within ten minutes, the solution had become too thick to stir. The flask was kept closed in an ice bath for 24 hours. The solid polymerizate was dissolved in 3600 parts of tetrahydrofuran containing 36 parts of 28% ammonia solution, 40 parts of water, and 1 part of 2,2'-methylenebis(4-methyl-6-tert-butylphenol). The polymer was precipitated by adding to a large volume of water and was washed several times in fresh water. After drying by milling on a rubber mill at 100–110° C., there was obtained 209 parts of a rubbery polymer having an inherent viscosity of 2.62 in benzene (0.10 g./100 cc.) at 30° C.

When the above was repeated, except that the catalyst was introduced into the mixture of all the monomeric cyclic ethers, a similar polymer was obtained.

B. 30 parts of the polymer prepared in A above was compounded on a rubber mill with 9 parts of high abrasion furnace black, 0.9 part of mercaptobenzothiazole disulfide, 0.6 part of mercaptobenzothiazole, 0.21 part of mercaptobenzothiazole disulfide/zinc chloride complex, 0.02 part of zinc oxide, and 0.15 part of sulfur, and the compound was vulcanized in molds under pressure for 30 minutes at 150° C. The rubbery vulcanizate had a tensile strength of 3500 lbs./sq. in.; an elongation of 600%; Shore hardness of 61; Yerzley resilience of 77%; compression set (method B, 22 hours, 70° C.) of 14%; and did not freeze in one week at −20° C.

Example 8

A. In a flask which had been heated over a flame and cooled in nitrogen was put 15.8 parts of tetrahydrofuran, freshly distilled under nitrogen from lithium aluminum hydride, 3.1 parts of 1,2-propylene oxide, freshly distilled from calcium hydride, and 1.5 parts of 3-ethyl-3-allyloxymethyloxacyclobutane, freshly distilled from calcium hydride at reduced pressure. The flask was cooled in ice and, while sweeping dry nitrogen over the neck, 0.19 part (by volume) of a 0.14 molar solution of antimony pentafluoride in dry 1,1,2-trifluorotrichloroethane was added. The flask was stoppered and kept in ice for three days. The solid polymerizate was dissolved in 220 parts of tetrahydrofuran containing 1.4 parts of 28% ammonia solution, 1.5 parts of water, and 0.06 part of 2,2'-methylenebis(4-methyl-6-tert-butylphenol). The polymer was precipitated by adding to a large volume of water and was washed several times in fresh water. After drying in vacuum over calcium chloride, there was obtained 15.7 parts of a soft, rubbery polymer having an inherent viscosity of 2.64 in benzene (0.10 g./100 cc.) at 30° C. This polymer was readily milled on a cold rubber mill.

B. 14 parts of the polymer prepared in A above was compounded on a rubber mill with 4.2 parts of high abrasion furnace black, 0.42 part of mercaptobenzothiazole disulfide, 0.28 part of mercaptobenzothiazole, 0.05 part of mercaptobenzothiazole disulfide/zinc chloride complex, 0.07 part of cadmium stearate, and 0.07 part of sulfur, and the compound was vulcanized in molds under pressure for 60 minutes at 150° C. The resulting elastomer had a tensile strength of 2300 lbs./sq. in.; an elongation of 550%; Shore hardness of 62; Yerzley resilience of 69%; compression set (method B, 22 hours, 70° C.) of 11%; TR 50 value (hexane solvent) of −24.5° C.

Example 9

A. In a 5-liter flask with agitator, which had been heated over a flame and cooled with nitrogen sweeping through, were placed 907 parts of tetrahydrofuran (distilled from lithium aluminum hydride), 84 parts of 1,2 propylene oxide (distilled from calcium hydride), 87 parts of 3-allyloxymethyl-3-methyloxetane (distilled from lithium aluminum hydride), and 0.42 part of p-chlorobenzenediazonium hexafluorophosphate. The concentrations of reactants were: 86 mol percent of tetrahydrofuran, 9.8 mol percent of propyleneoxide, 4.2 mol percent of allyloxymethyl-3-methyloxetane and 0.01 mol percent of catalyst. The solution was agitated and the temperature held at 25° ± 2° C. by cooling. After the solution had become too thick to stir, the agitator was raised above the polymer. After about 20 hours the soft, yellow polymer was dissolved in 9350 parts of tetrahydrofuran containing 2.6 parts of phenyl-β-naphthylamine, 105 parts of concentrated aqueous ammonium hydroxide solution, and 105 parts of water. The polymer was precipitated in a large volume of water, and was washed by repeated soaking in fresh water. It was dried by milling on a rubber mill at 100° C. There was obtained 852 parts of a tan colored rubbery polymer having an intrinsic viscosity of 2.48 in benzene at 30° C. and an iodine number of 19.0.

B. 100 parts of this polymer was compounded on a rubber mill with 50 parts of high abrasion furnace black, 3 parts of 2,2'-dithio-bis-benzothiazole, 2 parts of 2-mercaptobenzothiazole, and 0.7 part of 1:1 molar complex of zinc chloride with 2,2'-dithio-bis-benzothiazole, 0.7 part of zinc oxide, 0.7 part of phenyl-β-naphthylamine. The compounded material was cured at 150° C. for 30 minutes and yielded a cured elastomer having the following physical properties: tensile strength of 2550 lbs./sq. in., elongation of 310%, modulus at 300%, extension of 2440 lbs./sq.in., resilience of 67%, and compression set of 12% (method B, 22 hours, 70° C.).

*Example 10*

A. 286.5 parts of tetrahydrofuran (distilled from lithium aluminum hydride), 173 parts of 3,3-diethyloxetane (distilled from calcium hydride), and 33 parts of 3-allyloxymethyl-3-methyloxetane (distilled from lithium aluminum hydride) were added to a dry 5-liter glass flask under a protective nitrogen atmosphere. The concentrations in mol percent were: tetrahydrofuran, 69.5; 3,3-diethyloxetane, 26.5; 3-allyloxymethyl-3-methyloxetane, 4.0. The flask was cooled in ice to a temperature of about −16° C. Then 0.61 part of phosphorous pentafluoride was bubbled in over a half-hour period while agitation was maintained. The mixture became very viscous and the temperature rose to about 5° C. Agitation was then stopped and the mixture kept at 0° C. for about 18 hours. The tan, soft, rubbery polymer obtained was dissolved with agitation in about 6360 parts of tetrahydrofuran solution containing 0.02% phenyl-β-naphthylamine, 1% concentrated aqueous ammonium hydroxide solution and 1% water by weight. The polymer was precipitated from this solution by pouring it into a large volume of water. It was then washed by repeated soaking in fresh water and finally dried by milling on a rubber mill at 100° C. for 10 minutes. 417 parts of a soft, rubbery, light brown polymer was obtained having an inherent viscosity of 2.13 in benzene at 30° C. and an iodine number of 16.8.

B. 100 parts of the uncured polymer prepared in A above was compounded on a rubber roll mill with 30 parts of high abrasion furnace black, 3 parts of 2,2'-dithio-bis-benzothiazole, 2 parts of 2-mercaptobenzothiazole, 0.7 part of a 1:1 molar complex of zinc chloride and 2,2'-dithio-bis-benzothiazole, 0.07 part of zinc oxide, 0.5 part of sulfur, and 1 part of phenyl-β-naphthylamine. The compounded stock was cured at 150° C. for 30 minutes. The vulcanizate obtained had the following physical properties:

Tensile strength at break (25° C.), lb./sq.in. ____ 3000
Elongation at break (25° C.), percent _____ 580
Modulus at 300% elongation (25° C.), lb./sq.in. __ 820
Yerzley resilience (25° C.), percent _____ 76
Shore hardness _____ 52
Smear point _____ 320° C.
Compression set (70° C.), percent _____ 18

*Example 11*

A. Into a dry 2-liter reaction flask equipped with an agitator were introduced under a sweep of dry nitrogen, 219 parts of tetrahydrofuran, 69 parts of 3,3-diethyloxetane, and 25 parts of 3-methyl-3(4-pentenyloxymethyl)-oxetane (distilled from lithium aluminum hydride). The concentration of reactants was: tetrahydrofuran, 80.1 mol percent; 3,3-diethyloxetane, 16.0 mol percent; and 3-methyl-3(4-pentenyloxymethyl)oxetane, 3.9 mol percent.

The flask was cooled in ice to a temperature of about 1.5° C. During the next 45 minutes, 0.40 part of phosphorous pentafluoride was bubbled into the mixture while agitation was continued. The mixture became very viscous and its temperature rose to 8° C. Agitation was stopped and the mixture subsequently kept at 0° C. for about 22 hours. The light yellow polymer obtained was dissolved in 4440 parts of tetrahydrofuran containing 1.25 parts of 2,2'-methylene-bis-(4-methyl-6-tertiary butylphenol), 50 parts of concentrated aqueous ammonia, and 50 parts of water. The polymer was precipitated by pouring the solution into a large volume of water. It was washed by repeated soaking in fresh water and finally dried by milling on a rubber mill at 100° C. for 10 minutes. 269 parts of a soft, nearly colorless, rubbery polymer were obtained which had an inherent viscosity of 2.92 in benzene at 30° C. and an iodine number of 13.7.

B. 100 parts of the uncured polymer prepared in A above was compounded on a rubber roll mill with 30 parts of high abrasion furnace black, 3 parts of 2,2'-dithiobis-benzothiazole, 2 parts of 2-mercaptobenzothiazole, 0.7 part of a 1:1 molar zinc chloride/2,2'-dithio-bis-benzothiazole complex, 0.07 part of zinc oxide, 0.3 part of sulfur, and 1 part of phenyl-β-naphthylamine. The compounded stock was cured at 150° C. for 30 minutes. The rubbery vulcanizate obtained had the following physical properties:

Tensile strength at break (25° C.), lb./sq.in. ____ 2470
Elongation at break (25° C.), percent _____ 545
Modulus at 300% elongation (25° C.), lb./sq.in. __ 730
Yerzley resilience (25° C.), percent _____ 73
Shore hardness _____ 58
Compression Set (70° C.), percent _____ 17

*Example 12*

A. Into a 2-liter flask equipped with an agitator and continually swept with nitrogen were introduced 189 parts of tetrahydrofuran (distilled from lithium aluminum hydride), 12 parts of biallylmonoepoxide (distilled from calcium hydride), and 16.3 parts of 1,2 propylene oxide (distilled from calcium hydride). The concentrations of the reactants were: tetrahydrofuran, 86.7 mol percent; biallylmonoepoxide, 4.0 mol percent; and propylene oxide 9.3 mol percent. To this mixture at 23° C. was added with stirring 0.086 part of p-chlorobenzene diazonium hexafluorophosphate. The mixture was subsequently agitated at about 23–25.5° C. for 2 hours and 20 minutes. The viscosity increased during this interval. The mixture was then allowed to stand for about 16 hours at room temperature. The soft polymer obtained was readily dissolved in about 1332 parts of tetrahydrofuran containing 1% concentrated aqueous ammonia, 1% water, and 0.025% phenyl-β-naphthylamine by weight. The clear, viscous, yellow solution obtained was poured into water. The precipitated polymer was repeatedly soaked with water and dried by milling on a rubber mill for 10 minutes at 100° C. 173 parts of soft, yellow product were obtained which had an inherent viscosity of 2.31 in benzene at 30° C. and an iodine number of 16.6.

B. 100 parts of the uncured polymer prepared in A above was compounded on a rubber mill with 10 parts of high abrasion furnace black, 0.60 part of 2,2'-dithio-bis-benzothiazole, 0.40 part of 2-mercaptobenzothiazole, 0.14 part of 1:1 molar complex of zinc chloride/2,2'-dithio-bis-benzothiazole, 0.014 part of zinc oxide, 0.10 part of sulfur, 0.15 part of phenyl-β-naphthylamine. The compounded stock was cured at 150° C. for 1 hour. The rubbery vulcanizate obtained displayed the following properties:

Tensile strength at break (25° C.), lb./sq. in. _____ 2900
Elongation at break (25° C.), percent _____ 400
Modulus at 300% elongation (25° C.), lb./sq.in __ 1980
Yerzley resilience (25° C.), percent _____ 68
Sore hardness _____ 70
Compression set (70° C.), percent _____ 14

Example 13

A. To a 5-liter glass equipped with an agitator and swept with nitrogen were added 285 parts of tetrahydrofuran, 160.2 parts of 1,2-propylene oxide, and 41.3 parts of 3-allyloxymethyl-3-methyloxetane. Their respective concentrations in mol percents were: 56.5, 39.4, and 4.1. Then 0.20 part of p-chloro-benzenediazonium hexafluorophosphate was introduced with agitation into the above mixture at 25° C. The mixture steadily increased in viscosity over the next 5 hours while agitation was maintained at 22–24.5° C. The mixture was then allowed to stand overnight at room temperature. The sticky syrup obtained was dissolved with stirring in 2,664 parts of tetrahydrofuran containing 1% water, 1% concentrated aqueous ammonia, and 0.025% phenyl-β-naphthylamine by weight. The polymer was precipitated by pouring the solution into a large volume of water. After water-washing and subsequent drying on a rubber roll mill at 100° C., there was obtained 291 parts of a soft, tacky polymer displaying an inherent viscosity of 1.57 in benzene at 30° C. and an iodine number of 24.5.

B. 50 parts of the polymer prepared in A above was compounded with 25 parts of high abrasion furnace black, 0.38 part of phenyl-β-naphthylamine, 1.5 part of 2,2'-dithio-bis-benzothiazole, 1.0 part of 2-mercaptobenzothiazole, 0.35 part of a 1:1 molar complex of zinc chloride/2,2'-dithio-bis-benzothiazole, 0.035 part of zinc oxide, and 0.50 part of sulfur. The compounded stock was cured at 150° C. for 1 hour. The vulcanizate obtained had the following properties:

| | |
|---|---|
| Tensile strength at break (25° C.), lb.sq. in. | 1600 |
| Elongation at break (25° C.), percent | 210 |
| Modulus at 200% elongation (25° C.), lb./sq. in. | 1550 |
| Yerzley resilience (25° C.), percent | 57 |
| Shore hardness | 70 |
| Compression set (70° C.), percent | 10 |

Example 14

A. Into a mixture of 78.5 parts of tetrahydrofuran, 93.5 parts of ethylene oxide, and 15.1 parts of 3-allyloxymethyl-3-methyloxetane contained in a 2-liter glass flask immersed in ice was bubbled 0.21 part of phosphorus pentafluoride catalyst. The concentrations of reactants in mol percent were, respectively: 32.7, 64.0 and 3.3. The increasingly viscous mixture was agitated at 0° C. for 5 hours. The stirrer was then raised and the mixture was allowed to stand in an ice bath for about 21 hours. The clear, almost colorless, soft solid obtained was easily dissolved in about 1332 parts of tetrahydrofuran solution containing 0.2 part of 2,2'-methylene-bis(4-methyl-6-tertiary butylphenol), 15 parts of concentrated aqueous ammonia and 15 parts of water. The polymer was precipitated by pouring the solution into a large volume of water and introducing 25–50 parts of sodium chloride. It was then washed with water and dried under vacuum. 110 parts of a light tan, slightly tacky rubbery polymer was obtained which exhibited an inherent viscosity of 1.96 in benzene at 30° C.

B. 100 parts of the polymer made in A above was compounded on a rubber roll mill with 1 part of phenyl-β-naphthylamine, 30 parts of high abrasion furnace black, 5 parts of zinc oxide, 1 part of tetramethylthiuram disulfide, and 0.5 part of sulfur. The compounded stock was cured at 150° C. for 1 hour. The vulcanizate obtained displayed the following properties:

| | |
|---|---|
| Tensile strength at break (25° C.), lb./sq. in. | 2550 |
| Elongation at break (25° C.), percent | 660 |
| Modulus at 300% elongation (25° C.), lb./sq. in. | 680 |
| Yerzley resilience (25° C.), percent | 64 |
| Shore hardness | 56 |
| Compression set (70° C.), percent | 27 |

Example 15

A. 652.8 parts of tetrahydrofuran, 149.3 parts of 3,3-diethyloxetane, and 72.7 parts of 3(4-methyl-4-pentenyl-oxymethyl)-3-methyloxetane (respective concentrations of reactants in mol percents: 84, 12 and 4) were agitated with 10 parts of p-chloro-benzene diazonium hexafluorophosphate in a dry reaction vessel swept with nitrogen and immersed in ice. The reactants were allowed to stand for about 16 hours at about 0–5° C. The mixture obtained was then dissolved in 7104 parts of tetrahydrofuran containing 10 parts of phenyl-β-naphthylamine, and 70 parts of concentrated aqueous ammonia. The solution obtained was poured into a large volume of water and the precipitated polymer was washed with water and dried. 720.5 parts of a product were obtained which displayed an intrinsic viscosity of 1.83 in benzene at 30° C. and an iodine number of 17.

B. 100 parts of the uncured polymer made in A above was compounded on a rubber roll mill with 30 parts of high abrasion furnace black, 0.5 part of sulfur, 5 parts of zinc oxide, 3 parts of stearic acid, 1 part of 2,2'-dithio-bis-benzothiazole, and 2 parts of tetramethylthiuramdisulfide. The compounded stock was cured at 150° C. for 1 hour to give a vulcanizate which displayed the following properties:

| | |
|---|---|
| Tensile strength at break (25° C.), lb./sq. in. | 2500 |
| Elongation at break (25° C.), percent | 460 |
| Modulus at 300% elongation (25° C.), lb./sq. in. | 1240 |
| Yerzley resilience (25° C.), percent | 81 |
| Shore hardness | 63 |
| Compression set (70° C.), percent | 12 |

The polymers prepared according to this invention have many varied uses. They may be employed in the preparation of tires, inner tubes, belts, hose and tubing, wire and cable jackets, footwear, sponges, coated fabrics, and a wide variety of coated or molded articles. As stated earlier, they are characterized by good thermal and hydrolytic stability.

The elastomeric properties of these materials may be varied by suitable compounding. The amount and type of compounding agent to be incorporated into the stock is dependent upon the use for which the elastomer in intended. The compounding agents ordinarily used in the rubber industry with either natural or synthetic rubber are useful with the products of this invention. These include carbon black, clay, silica, esterified silica particles, talc, zinc and magnesium oxides, calcium and magnesium carbonate, titanium dioxide, and plasticizers. Inorganic and organic coloring agents may be incorporated to give well-defined colors, as the natural color of these elastomers is a pale yellow or light amber.

As many widely different embodiments of this invention may be made without departing from the spirit and scope thereof, it is to be understood that this invention is not limited to the specific embodiments thereof except as defined in the appended claims.

What is claimed is:

1. A millable, sulfur-curable polyalkylene ether polymer having a molecular weight of at least about 30,000 and consisting essentially of the recurring units (G—O) wherein G is a radical selected from the group consisting of an alkylene radical and a substituted alkylene radical wherein the substituents are free of any Zerewitinoff active hydrogen atoms and have a molecular weight of not greater than about 250, with the proviso that at least about one-third of the G's be tetramethylene radicals and that there be an average of at least one G for every 10,000 units of molecular weight of polymer, having a side chain which contains a non-aromatic, carbon-to-carbon unsaturated group, said side chain having a molecular weight of not greater than about 250.

2. The polymer of claim 1 wherein the side chain which contains a non-aromatic, carbon-to-carbon unsaturated group is an alkenyloxyalkyl radical.

3. The polymer of claim 2 wherein the alkenyloxyalkyl radical is an allyloxymethyl radical.

4. The polymer of claim 2 wherein the alkenyl-oxyalkyl radical is a 4-pentenyloxymethyl radical.

5. A millable, sulfur-curable polyalkyleneether polymer having a molecular weight of at least about 30,000 and consisting essentially of the recurring units (a) 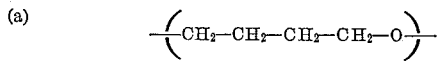

(b) 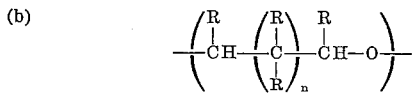

wherein the number of (a) units is at least one-third of the total number of recurring units, the recurring units being connected from a carbon atom on one to an oxygen atom on the other; $n$ is an integer ranging from zero to one; R is a radical having a molecular weight of not greater than 250 and selected from the group consisting of hydrogen, monovalent hydrocarbon, divalent hydrocarbon the free valence of which is joined to a free valence on another divalent R radical to form a cyclic structure, monovalent halogenated hydrocarbon, divalent halogenated hydrocarbon the free valence of which is joined to a free valence on another R radical to form a cyclic structure, oxa-analogs of said monovalent and di-valent hydrocarbon and halogenated hydrocarbon radicals, oxa-analogs of said divalent hydrocarbon radical the free valence of which is derived from an oxygen atom and is attached to a carbon atom in another recurring unit, and oxa-analogs of said divalent halogenated hydrocarbon radical the free valence of which is derived from an oxygen atom and is attached to a carbon atom in another recurring unit, with the proviso that any oxygen atom which is present in an R radical be an acyclic ether oxygen which is at least 2 carbon atoms removed from any other ether oxygen and from any halogen atom in the polymer; there being an average of at least one R radical which contains non-aromatic, carbon-to-carbon unsaturation for every 10,000 units of molecular weight of polymer.

6. A millable, sulfur-curable polyalkyleneether polymer having a molecular weight of at least about 30,000 and consisting essentially of the recurring units (a) 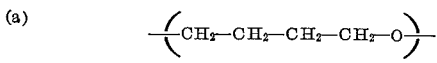

(b) 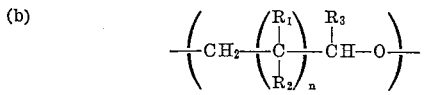

wherein the number of (a) units is at least one-third of the total number of recurring units, the recurring units being connected from a carbon atom on one to an oxygen atom on the other; $n$ is an integer ranging from zero to one; $R_1$ is a radical having a molecular weight of not greater than about 250 and selected from the group consisting of hydrogen, alkyl, chloroalkyl, alkenyl, and alkenyl-oxyalkyl; $R_2$ is a radical having a molecular weight of not greater than about 250 and selected from the group consisting of hydrogen, alkyl, and chloroalkyl; and $R_3$ is a radical having a molecular weight of not greater than about 250 and selected from the group consisting of hydrogen, alkyl, alkenyloxyalkyl, alkenyl, and phenoxyalkyl; with the proviso that in a sufficient number of the recurring units at least one of $R_1$ and $R_3$ be a radical selected from the group consisting of alkenyloxyalkyl and alkenyl radicals so as to provide an average of at least one such radical for every 10,000 units of molecular weight of polymer.

7. A millable, sulfur-curable polyalkyleneether polymer having a molecular weight of at least about 30,000 and consisting essentially of the units (a) 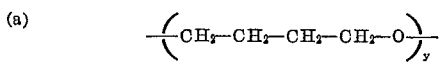

(b) 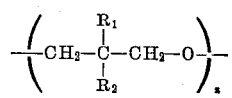

and (c) 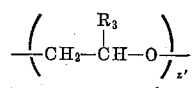

wherein $y$ is an integer greater than zero; $z$ and $z'$ are integers including zero provided the sum of $z$ and $z'$ is greater than zero; with the proviso that the number of (a) units is at least one-third of the total number of units, with said units being connected from a carbon atom of one to an oxygen atom on the other; $R_1$ is a radical having a molecular weight of not greater than 250 and selected from the group consisting of hydrogen, alkyl, chloroalkyl, alkenyl and alkenyloxyalkyl; $R_2$ is a radical having a molecular weight of not greater than 250 and selected from the group consisting of hydrogen, alkyl, and chloroalkyl; and $R_3$ is a radical having a molecular weight of not greater than 250 and selected from the group consisting of hydrogen, alkenyl, alkyl, alkenyloxyalkyl, and phenoxyalkyl; with the proviso that at least one of $R_1$ and $R_3$ be a radical selected from the group consisting of alkenyloxyalkyl and alkenyl radicals so as to provide an average of at least one such radical for every 10,000 units of molecular weight of polymer.

8. The polymer of claim 7 wherein both $z$ and $z'$ are integers greater than zero, $R_1$ and $R_2$ are chloromethyl radicals and $R_3$ is an allyloxymethyl radical.

9. The polymer of claim 7 wherein both $z$ and $z'$ are integers greater than zero, $R_1$ is a methyl radical, $R_2$ is an allyloxymethyl radical, and $R_3$ is a methyl radical.

10. The polymer of claim 7 wherein $z'$ is zero, $z$ is an integer greater than zero representing the sum of two different units, in one of said units $R_1$ and $R_2$ both being ethyl radicals and in the other of said units, $R_1$ being a methyl radical and $R_2$ being an allyloxymethyl radical.

11. A process for the preparation of a millable, sulfur-curable polyalkyleneether polymer having a molecular weight of at least about 30,000 which comprises reacting tetrahydrofuran with a compound selected from the group consisting of oxetanes, oxiranes and mixtures of both, in the presence of from 0.005 to 0.5 mol percent of cationic polymerization catalyst based on the mols of cyclic ethers employed and at a temperature of from about −80 to 70° C., and recovering the resulting polyalkyleneether polymer; with the proviso that at least 33⅓ mol percent of said reactants be tetrahydrofuran and that at least one of said oxetanes or oxiranes have a side chain containing non-aromatic, carbon-to-carbon unsaturation so as to provide at least one of said side chains for every 10,000 units of molecular weight of polymer, said side chain having a molecular weight of not greater than about 250.

12. A process according to claim 11 wherein the oxirane has the formula

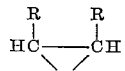

and the oxetane has the formula

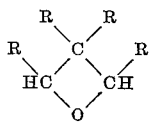

wherein R is a radical having a molecular weight of not greater than 250 and selected from the group consisting of hydrogen, monovalent hydrocarbon, divalent hydrocarbon the free valence of which is joined to a free valence on another divalent R radical to form a cyclic structure, monovalent halogenated hydrocarbon, divalent halogenated hydrocarbon the free valence of which is joined to a free valence on another R radical to form a cyclic structure, oxa-analogs of said monovalent and divalent hydrocarbon and halogenated hydrocarbon radicals, oxa-analogs of said divalent hydrocarbon radical the free valence of which is derived from an oxygen atom and is attached to a carbon atom in another recurring unit, and oxa-analogs of said divalent halogenated hydrocarbon radical the free valence of which is derived from an oxygen atom and is attached to a carbon atom in another recurring unit, with the proviso that any oxygen atom which is present in an R radical be an acyclic ether oxygen which is at least 2 carbon atoms removed from any other ether oxygen and from any halogen atom in the polymer; there being an average of at least one R radical which contains non-aromatic, carbon-to-carbon unsaturation for every 10,000 units of molecular weight of polymer.

13. A process according to claim 11 wherein the tetrahydrofuran is reacted with a mixture of 3,3-diethyl oxetane and 3-allyloxymethyl-3-methyl oxetane.

14. A process according to claim 11 wherein the tetrahydrofuran is reacted with 1,2-propylene oxide and 3-allyloxymethyl-3-methyl oxetane.

15. A cured elastomer obtained by heating a polyalkyleneether polymer to a temperature of at least about 125° C. with sulfur in the presence of vulcanization accelerators, said polymer being a millable, sulfur-curable polymer having a molecular weight of at least about 30,000 and consisting essentially of the recurring units $\text{-(G—O)-}$ wherein G is a radical selected from the group consisting of an alkylene radical and a substituted alkylene radical wherein the substituents are free of any Zerewitinoff active hydrogen atoms and have a molecular weight of not greater than about 250, with the proviso that at least about one-third of the G's be tetramethylene radicals and that there be an average of at least one G for every 10,000 units of molecular weight of polymer, having a side chain which contains a non-aromatic, carbon-to-carbon unsaturated group, said side chain having a molecular weight of not greater than about 250.

16. A cured elastomer obtainer by heating a polyalkyleneether polymer to a temperature of at least about 125° C. with sulfur in the presence of vulcanization accelerators, said polymer being a millable, sulfur-curable polymer having a molecular weight of at least about 30,000 and consisting essentially of the recurring units (a) $-(\text{CH}_2-\text{CH}_2-\text{CH}_2-\text{CH}_2-\text{O})-$ (b) 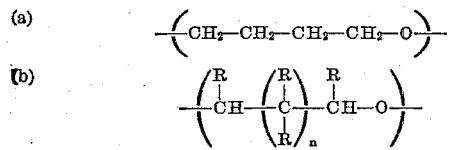

wherein the number of (a) units is at least one-third of the total number of recurring units, the recurring units being connected from a carbon atom on one to an oxygen atom on the other; $n$ is an integer ranging from zero to one; R is a radical having a molecular weight of not greater than 250 and selected from the group consisting of hydrogen, monovalent hydrocarbon, divalent hydrocarbon the free valence of which is joined to a free valence on another divalent R radical to form a cyclic structure, monovalent halogenated hydrocarbon, divalent halogenated hydrocarbon the free valence of which is joined to a free valence on another R radical to form a cyclic structure, oxa-analogs of said monovalent and divalent hydrocarbon and halogenated hydrocarbon radicals, oxa-analogs of said divalent hydrocarbon radical the free valence of which is derived from an oxygen atom and is attached to a carbon atom in another recurring unit, and oxa-analogs of said divalent halogenated hydrocarbon radical the free valence of which is derived from an oxygen atom and is attached to a carbon atom in another recurring unit, with the proviso that any oxygen atom which is present in an R radical be an acyclic ether oxygen which is at least 2 carbon atoms removed from any other ether oxygen and from any halogen atom in the polymer; there being an average of at least one R radical which contains non-aromatic, carbon-to-carbon unsaturation for every 10,000 units of molecular weight of polymer.

References Cited by the Examiner
UNITED STATES PATENTS

| | | | |
|---|---|---|---|
| 2,394,862 | 2/1946 | Loder | 260 |
| 2,522,680 | 9/1950 | Kropa et al. | 260 |
| 2,692,873 | 10/1956 | Langerak et al. | 260—77.5 |
| 2,808,391 | 10/1957 | Pattison | 260—77.5 |
| 2,924,607 | 2/1960 | Pattison | 260—20 X |

FOREIGN PATENTS

| | | |
|---|---|---|
| 733,624 | 7/1955 | Great Britain. |
| 1,116,218 | 5/1956 | France. |

OTHER REFERENCES

Meerwein: "Resins, Rubbers, Plastics," Mark and Praskaver Interscience Pub. Co., N.Y., p. 1063, 1947.

WILLIAM H. SHORT, *Primary Examiner.*

MILTON STERMAN, PHILIP E. MANGAN, H. N. BURSTEIN, JOSEPH R. LIBERMAN, *Examiners.*

G. A. DEPAOLI, J. T. BROWN, J. C. MARTIN, *Assistant Examiners.*